(12) United States Patent
Agrawal et al.

(10) Patent No.: US 11,675,611 B2
(45) Date of Patent: Jun. 13, 2023

(54) SOFTWARE SERVICE INTERVENTION IN A COMPUTING SYSTEM

(71) Applicant: Nutanix, Inc., San Jose, CA (US)

(72) Inventors: Akash Agrawal, Odisha (IN); Anupam Chakraborty, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 88 days.

(21) Appl. No.: 16/173,260

(22) Filed: Oct. 29, 2018

(65) Prior Publication Data
US 2020/0133701 A1  Apr. 30, 2020

(51) Int. Cl.
*G06F 9/455*  (2018.01)
*G06F 9/48*  (2006.01)

(52) U.S. Cl.
CPC .......... *G06F 9/45558* (2013.01); *G06F 9/485* (2013.01); *G06F 2009/45583* (2013.01)

(58) Field of Classification Search
None
See application file for complete search history.

(56) References Cited

U.S. PATENT DOCUMENTS

| | | |
|---|---|---|
| 8,219,653 B1 | 7/2012 | Keagy et al. |
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 2009/0328035 A1 | 12/2009 | Ganguly |
| 2013/0159461 A1 | 6/2013 | Al et al. |
| 2013/0163606 A1 | 6/2013 | Bagepalli et al. |
| 2013/0297802 A1* | 11/2013 | Laribi ............... H04L 47/80 709/226 |
| 2013/0311645 A1* | 11/2013 | Nagami ............ G06F 11/0757 709/224 |

(Continued)

OTHER PUBLICATIONS

Cano, Ignacio et al. "Curator: Self-Managing Storage for Enterprise Clusters"; University of Washington; published Mar. 2017; pp. all.

(Continued)

*Primary Examiner* — Lewis A Bullock, Jr.
*Assistant Examiner* — Melissa A Headly
(74) *Attorney, Agent, or Firm* — Stoel Rives LLP (57) ABSTRACT

A system may include multiple computing nodes, each including a hypervisor, a controller virtual machine and multiple virtual machines. The hypervisor may include a host agent configured to start a service and determine whether a performance of the service has met a criteria. If the performance of the service has met the criteria, the hypervisor may further determine whether the service has any pending critical operations, and if no critical operations are pending, stop the service. In some examples, each service may create a process configured to monitor the performance of the service. Examples of the performance of the service may include memory utilization and the service response time.

38 Claims, 5 Drawing Sheets

(56) References Cited

U.S. PATENT DOCUMENTS

| | | | |
|---|---|---|---|
| 2014/0040885 A1* | 2/2014 | Donahue | G06F 9/45558 718/1 |
| 2014/0075439 A1 | 3/2014 | Wang et al. | |
| 2014/0149980 A1 | 5/2014 | Vittal et al. | |
| 2015/0188989 A1* | 7/2015 | Chaliparambil | H04L 67/10 709/204 |

OTHER PUBLICATIONS

Poitras, Steven "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

SOFTWARE SERVICE INTERVENTION IN A COMPUTING SYSTEM

TECHNICAL FIELD

This disclosure is related to software service intervention. Examples of stopping software services while performing non-critical operations in a computing system are described.

BACKGROUND

In a computing system, a software service may have bugs that cause unnecessary resource consumption of the system. For example, software written in languages such as Java, Python, C #, etc., does not free the objects itself. Rather, it relies on garbage collection. When the garbage collection fails to free up the memory, a memory leak occurs. If a software service is running for an extended period of time, such as two weeks, the memory leak may accumulate to become significant in that it causes the response time for delivering services to increase, which affects the performance of the system. When these problems occur, the software service often needs to be intervened upon, such as stopped and restarted to clear memory leaks or regain other wasted computing resources. This software service intervention, however, is sometimes difficult to manage. For example, interrupting a software service prematurely may cause a loss to the system, especially when the software service is performing critical operations that are requested by other services. In that case, stopping and restarting a software service may, on the other hand, impair the system performance by interrupting critical operations. It may also be difficult for a system to determine, external to a software service, when the software service is due to restart or when the software service is performing critical operations that should not be interrupted. This is particularly so when the cause of the memory leak is from a library that is utilized by the software service. In such case, the library code was already in a compiled format and cannot be readily adapted to allow proper software service intervention.

DETAILED DESCRIPTIONS

Certain details are set forth herein to provide an understanding of described embodiments of technology. However, other examples may be practiced without some of these particular details. In some instances, well-known circuits, control signals, timing protocols, computer system components, and/or software operations have not been shown in detail in order to avoid unnecessarily obscuring the described embodiments. Other embodiments may be utilized, and other changes may be made, without departing from the spirit or scope of the subject matter presented here.

Software services described herein may include one or more software programs that may be executed in a computing system, whether on a desktop computer, an electronic device or a cloud. The software program may be an executable program that can be launched by a user, a daemon that may be executed in an operation system, or an application that may be executed on a mobile electronic device. The software service may also be a hardware-based application that executes in hardware, such as an application specific integrated circuit (ASIC) or a field-programmable gate array (FPGA). In a cloud system, the software service may execute in a virtual machine (VM) or a hypervisor.

Figure 1:
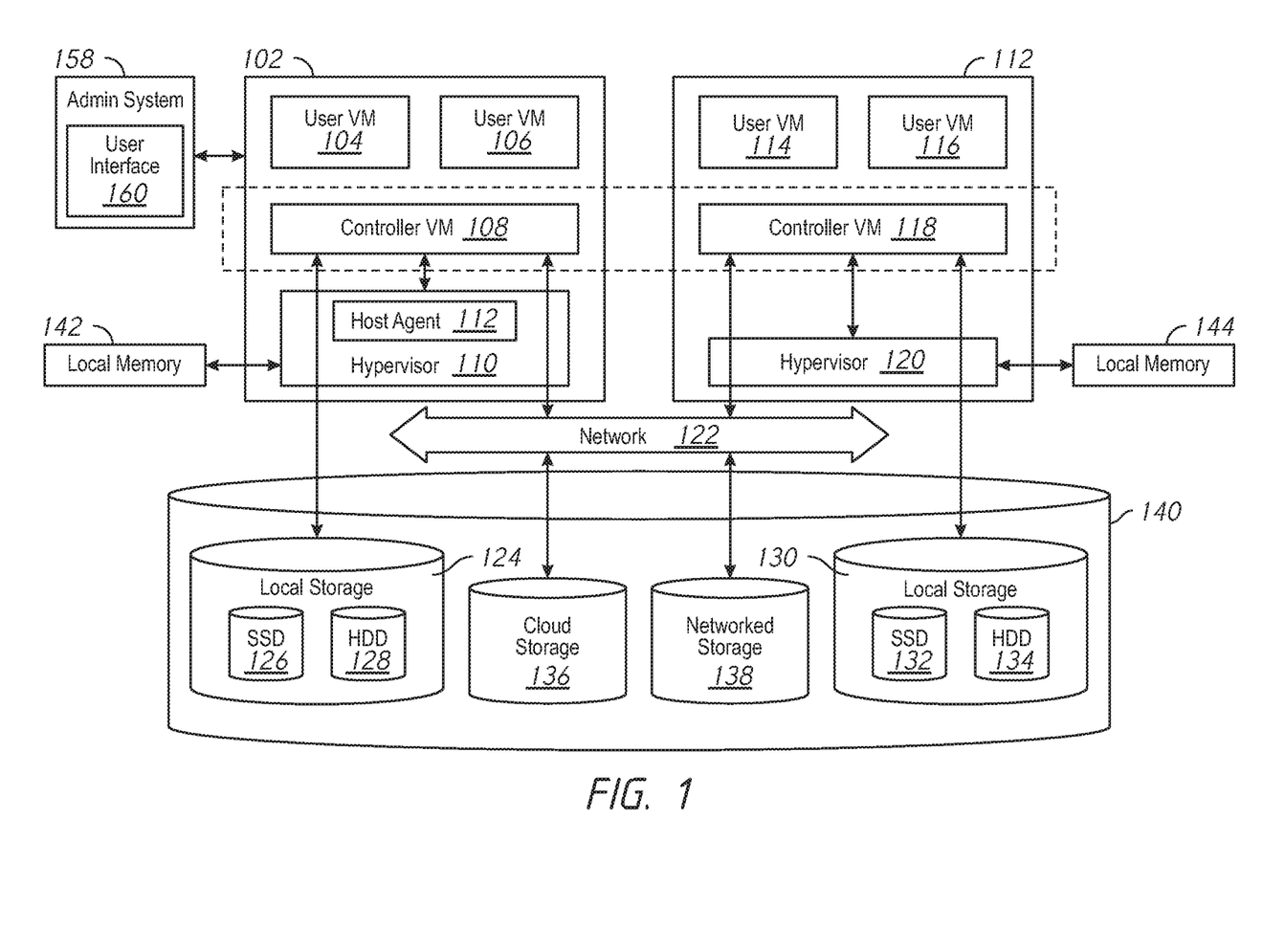
FIG. 1 is a block diagram of a distributing computing system implementing the software service intervention in FIG. 1.
Figure 3:
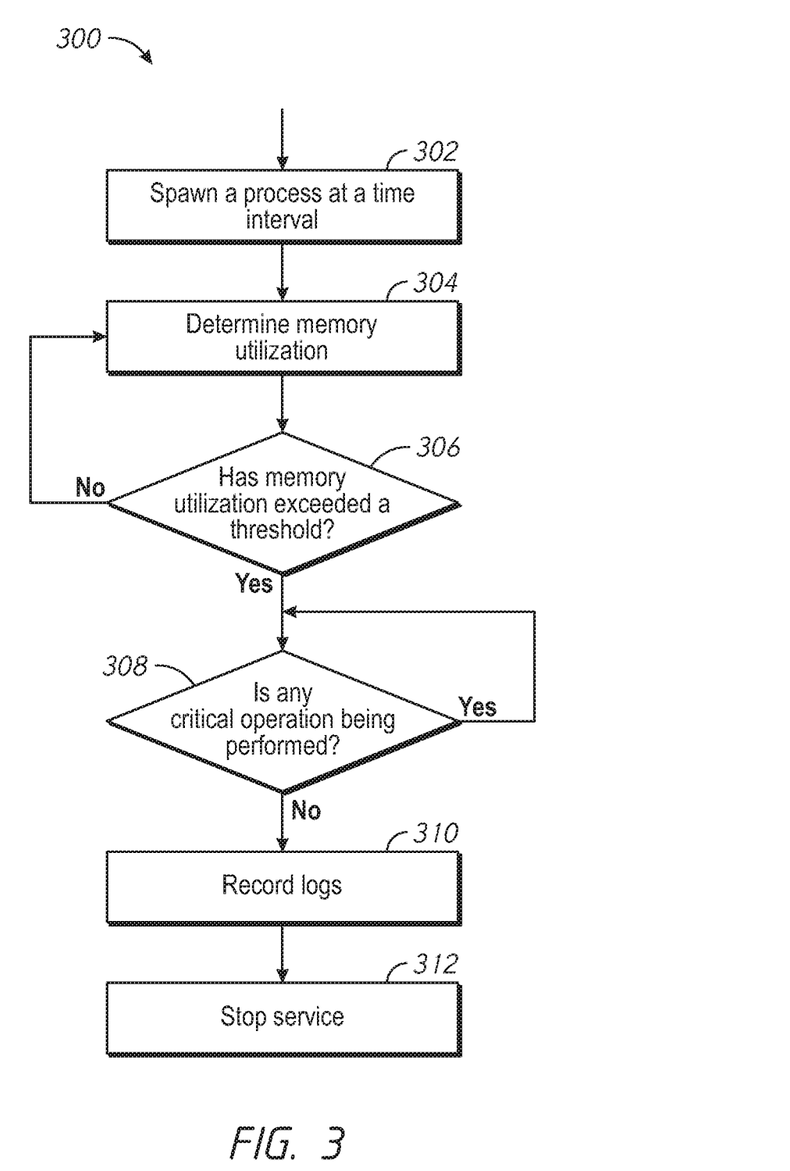
FIGS. 3-4 are diagrams of example processes of stopping a service in accordance with examples described herein.

A software service intervention system described herein may be implemented in a computing system. For example, a host agent for managing software service intervention may be implemented in a virtual machine over a distributed computing system. In FIG. 3, a distributed computing system generally includes multiple computing nodes 102, 112, and storage 140 connected to a network 122. The network 122 may be any type of network capable of routing data transmissions from one network device (e.g., computing node 102, computing node 112, and storage 140) to another. For example, the network 122 may be a local area network (LAN), wide area network (WAN), intranet, Internet, or a combination thereof. The network 122 may be a wired network, a wireless network, or a combination thereof.

The storage 140 may include local storage 124, local storage 130, cloud storage 136, and networked storage 138. The local storage 124 may include, for example, one or more solid state drives (SSD 126) and one or more hard disk drives (HDD 128). Similarly, local storage 130 may include SSD 132 and HDD 134. Local storage 124 and local storage 130 may be directly coupled to, included in, and/or accessible by a respective computing node 102 and/or computing node 112 without communicating via the network 122. Other nodes, however, may access the local storage 124 and/or the local storage 130 using the network 122. Cloud storage 136 may include one or more storage servers that may be stored remotely to the computing node 102 and/or computing node 112 and accessed via the network 122. The cloud storage 136 may generally include any suitable type of storage device, such as HDDs, SSDs, or optical drives. Networked storage 138 may include one or more storage devices coupled to and accessed via the network 122. The networked storage 138 may generally include any suitable type of storage device, such as HDDs, SSDs, and/or NVM Express (NVMe). In various embodiments, the networked storage 138 may be a storage area network (SAN). The computing node 102 is a computing device for hosting VMs in the computing system of FIG. 1. The computing node 102 may be, for example, a server computer that executes a software service.

The computing node 102 may be configured to execute a hypervisor 110, a controller VM 108, and one or more user VMs, such as user VMs 104 or 106. The user VMs including user VM 104 and user VM 106 are virtual machine instances executing on the computing node 102. The user VMs including user VM 104 and user VM 106 may share a virtualized pool of physical computing resources such as physical processors and storage (e.g., storage 140). The user VMs including user VM 104 and user VM 106 may each have their own operating system, such as Windows or Linux. While a certain number of user VMs are shown, generally any suitable number may be implemented. User VMs may generally be provided to execute any number of applications which may be desired by a user.

The hypervisor 110 may be any type of hypervisor. For example, the hypervisor 110 may be ESX, ESX(i), Hyper-V, KVM, or any other type of hypervisor. The hypervisor 110 manages the allocation of physical resources (such as storage 140 and physical processors) to VMs (e.g., user VM 104, user VM 106, and controller VM 108) and performs various VM related operations, such as creating new VMs and cloning existing VMs. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API.

Controller VMs (CVMs) described herein, such as the controller VM 108 and/or controller VM 118, may provide services for the user VMs in the computing node. As an example of functionality that a controller VM may provide, the controller VM 108 may provide virtualization of the storage 140. Accordingly, storage 140 may be referred to as a storage pool. Controller VMs may provide management of the distributed computing system shown in FIG. 1. Examples of controller VMs may execute a variety of software and/or may serve the I/O operations for the hypervisor and VMs running on that node. In some examples, an SCSI controller, which may manage SSD and/or HDD devices described herein, may be directly passed to the CVM, e.g., leveraging PCI Pass-through in some examples. In this manner, controller VMs described herein may manage input/output (I/O) requests between VMs on a computing node and available storage, such as storage 140.

The computing node 112 may include user VM 114, user VM 116, a controller VM 118, and a hypervisor 120. The user VM 114, user VM 116, the controller VM 118, and the hypervisor 120 may be implemented similarly to analogous components described above with respect to the computing node 102. For example, the user VM 114 and user VM 116 may be implemented as described above with respect to the user VM 104 and user VM 106. The controller VM 118 may be implemented as described above with respect to controller VM 108. The hypervisor 120 may be implemented as described above with respect to the hypervisor 110. In the embodiment of FIG. 1, the hypervisor 120 may be a different type of hypervisor than the hypervisor 110. For example, the hypervisor 120 may be Hyper-V, while the hypervisor 110 may be ESX(i). In some examples, the hypervisor 110 may be of a same type as the hypervisor 120.

The controller VM 108 and controller VM 118 may communicate with one another via the network 122. By linking the controller VM 108 and controller VM 118 together via the network 122, a distributed network of computing nodes including computing node 102 and computing node 112 can be created.

Controller VMs, such as controller VM 108 and controller VM 118, may each execute a variety of services and may coordinate, for example, through communication over network 122. Services running on controller VMs may utilize an amount of local memory to support their operations. For example, services running on controller VM 108 may utilize memory in local memory 142. Services running on controller VM 118 may utilize memory in local memory 144. The local memory 142 and local memory 144 may be shared by VMs on computing node 102 and computing node 112, respectively, and the use of local memory 142 and/or local memory 144 may be controlled by hypervisor 110 and hypervisor 120, respectively. Moreover, multiple instances of the same service may be running throughout the system— e.g. a same services stack may be operating on each controller VM. For example, an instance of a service may be running on controller VM 108 and a second instance of the service may be running on controller VM 118.

Generally, controller VMs described herein, such as controller VM 108 and controller VM 118 may be employed to control and manage any type of storage device, including all those shown in storage 140 of FIG. 1, including local storage 124 (e.g., SSD 126 and HDD 128), cloud storage 136, and networked storage 138. Controller VMs described herein may implement storage controller logic and may virtualize all storage hardware as one global resource pool (e.g., storage 140) that may provide reliability, availability, and performance. IP-based requests are generally used (e.g., by user VMs described herein) to send I/O requests to the controller VMs. For example, user VM 104 and user VM 106 may send storage requests to controller VM 108 using over a virtual bus. Controller VMs described herein, such as controller VM 108, may directly implement storage and I/O optimizations within the direct data access path. Communication between hypervisors and controller VMs described herein may occur using IP requests.

Note that controller VMs are provided as virtual machines utilizing hypervisors described herein—for example, the controller VM 108 is provided behind hypervisor 110. Since the controller VMs run "above" the hypervisors, examples described herein may be implemented within any virtual machine architecture because the controller VMs may be used in conjunction with generally any hypervisor from any virtualization vendor.

Virtual disks (vDisks) may be structured from the storage devices in storage 140, as described herein. A vDisk generally refers to the storage abstraction that may be exposed by a controller VM to be used by a user VM. In some examples, the vDisk may be exposed via iSCSI ("internet small computer system interface") or NFS ("network file system") and may be mounted as a virtual disk on the user VM. For example, the controller VM 108 may expose one or more vDisks of the storage 140 and the hypervisor may attach the vDisks to one or more VMs, and the virtualized operating system may mount a vDisk on one or more user VMs, such as user VM 104 and/or user VM 106.

During operation, user VMs (e.g., user VM 104 and/or user VM 106) may provide storage input/output (I/O) requests to controller VMs (e.g., controller VM 108 and/or hypervisor 110). Accordingly, a user VM may provide an I/O request over a virtual bus to a hypervisor as an Internet Small Computer system Interface (iSCSI) and/or Network File system (NFS) request. The iSCSI generally refers to an IP-based storage networking standard for linking data storage facilities together. By carrying SCSI commands over IP networks, iSCSI can be used to facilitate data transfers over intranets and to manage storage over any suitable type of network or the Internet. The iSCSI protocol allows iSCSI initiators to send SCSI commands to iSCSI targets at remote locations over a network. In some examples, user VMs may send I/O requests to controller VMs in the form of NFS requests. The NFS refers to an IP-based file access standard in which NFS clients send file-based requests to NFS servers via a proxy folder (directory) called "mount point". Generally, then, examples of systems described herein may utilize an IP-based protocol (e.g., iSCSI and/or NFS) to communicate between hypervisors and controller VMs.

During operation, examples of user VMs described herein may provide storage requests using an IP based protocol, such as SMB. The storage requests may designate the IP address for a controller VM from which the user VM desires I/O services. The storage request may be provided from the user VM to a virtual switch within a hypervisor to be routed to the correct destination. For examples, the user VM 104 may provide a storage request to hypervisor 110. The storage request may request I/O services from controller VM 108 and/or controller VM 118. If the request is to be intended to be handled by a controller VM in a same service node as the user VM (e.g., controller VM 108 in the same computing node as user VM 104) then the storage request may be internally routed within computing node 102 to the controller VM 108. In some examples, the storage request may be directed to a controller VM on another computing node. Accordingly, the hypervisor (e.g., hypervisor 110) may provide the storage request to a physical switch to be sent over a network (e.g., network 122) to another computing node running the requested controller VM (e.g., computing node 112 running controller VM 118).

Accordingly, hypervisors described herein may manage I/O requests between user VMs in a system and a storage pool. Controller VMs may virtualize I/O access to hardware resources within a storage pool according to examples described herein. In this manner, a separate and dedicated controller (e.g., controller VM) may be provided for each and every computing node within a virtualized computing system (e.g., a cluster of computing nodes that run hypervisor virtualization software), since each computing node may include its own controller VM. Each new computing node in the system may include a controller VM to share in the overall workload of the system to handle storage tasks. Therefore, the examples described herein may be advantageously scalable, and may provide advantages over approaches that have a limited number of controllers. Consequently, examples described herein may provide a massively-parallel storage architecture that scales as and when hypervisor computing nodes are added to the system.

In some examples, the hypervisor, such as hypervisor 110, may include a host agent 112 configured to mediate communication between controller VM 108 and hypervisor 110. For example, host agent 112 may simulate a secure shell (SSH) connection to use a client/service socket to communicate from controller VM 108 to hypervisor 110. The host agent 112 may also be configured to manage software services. For example, host agent 112 may be configured to launch and/or stop one or more software services. In some examples, host agent 112 may be configured to access a host agent table and update the host agent table before starting or stopping a service, where the host agent table contains information about the services. For example, the host agent table may contain information that indicates when a critical operation is performed by a software service to be stopped.

Examples of critical operations may include a disaster recovery, such as backup of data in a storage device. In contrast, examples of non-critical operations may include collecting statistical data off the network. In some examples, the host agent table may be contained in a local memory, such as memory 142 and accessed by the hypervisor 110. The host agent table may also be contained in a local storage, such as 124, 130, a cloud storage such as 136, and a networked storage such as 130, which may be shared by one or more computer nodes 102, 112 on the computing network.

In some examples, each of the services launched by the host agent 112 may be configured to perform self-diagnosis and determine whether that service needs to be re-started. In performing the self-diagnosis operation, a process may determine whether the service performance has met a criteria, for example, whether the service performance has reached below a threshold. In some examples, the service performance may include memory utilization or service response time. The service performance will have reached below a threshold when the service has cumulatively caused significant memory leaks or the system response time has exceeded a threshold, in which case the service needs to be re-started. In some examples, the host agent may be configured to access the host agent table to determine whether the service can be immediately re-started or whether a re-start needs to be suspended. For example, if a service is performing a critical operation, the service may not be re-started immediately. On the other hand, if a service is not currently performing any critical operation and the service performance has reached below a threshold, the service may be stopped immediately and re-started.

Examples of systems described herein may include one or more administrator systems, such as admin system 158 of FIG. 1. The administrator system may be implemented using, for example, one or more computers, servers, laptops, desktops, tablets, mobile phones, or other computing systems. In some examples, the admin system 158 may be wholly and/or partially implemented using one of the computing nodes of a distributed computing system described herein. However, in some examples (such as shown in FIG. 1), the admin system 158 may be a different computing system from the virtualized system and may be in communication with a CVM of the virtualized system (e.g., controller VM 108 of FIG. 1) using a wired or wireless connection (e.g., over a network).

Administrator systems described herein may host one or more user interfaces, e.g., user interface 160. The user interface may be implemented, for example, by displaying a user interface on a display of the administrator system. The user interface may receive input from one or more users (e.g., administrators) using one or more input device(s) of the administrator system, such as, but not limited to, a keyboard, mouse, touchscreen, and/or voice input. The user interface 160 may provide input to controller VM 108 and/or may communicate with the host agent 112. The user interface 160 may be implemented, for example, using a web service provided by the controller VM 108 or one or more other controller VMs described herein. In some examples, the user interface 160 may be implemented using a web service provided by controller VM 108 and information from controller VM 108 may be provided to admin system 158 for display in the user interface 160.

Administrator systems may have access to (e.g., receive data from and/or provide data to) any number of clusters, including a single cluster or multiple clusters. In the example of FIG. 1, the admin system 158 may communicate with the host agent 112 to start or stop a service.

Figure 2A:
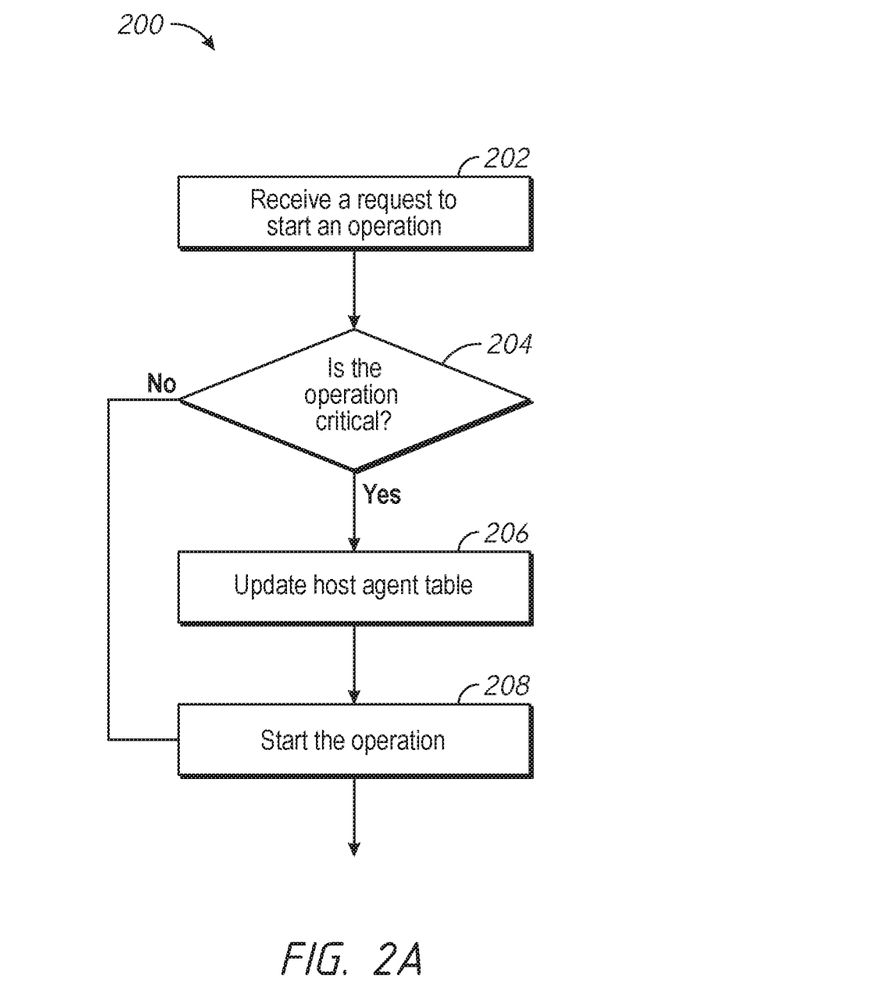
FIGS. 2A and 2B are diagrams of example processes associated with managing a software service in accordance with examples described herein.

With reference to FIG. 2A, a host agent (e.g., 112 in FIG. 1) may manage various software services. For example, a process 200 associated with a service may receive a request to start an operation at 202. The request may be from one or more processes of a service. The request may also be from another service. For example, a disaster recovery (DR) service may receive a request to start a backup operation. A network service may receive a request to obtain statistics of the network. Before starting the operation at 208, the process may determine whether the operation to be started includes any critical operations at 204. In some examples, the host agent may include a host agent table to record information about the critical operations that are pending. For example, if the operation includes a critical operation, the process may update the host agent table at 206 by inserting information about the critical operation to be started in the host agent table. In some examples, critical operations may be categorized into various types of operations, such as BackupVM1, BackupVM2, or other disaster recoveries. In some examples, each of the critical operations may have multiple instances as initiated by one or more services. Thus, the host agent table may include multiple entries, each entry corresponding to each type of critical operation. The host agent table may also include a count number associated with each type of critical operation. When a request for each critical operation is received from a process or service, the count number for that critical operation increments by one. By the time the process starts the operation at 208, information about all of the critical operations that are in operation (pending) in the service will have been fully recorded in the host agent table.

Figure 2B:
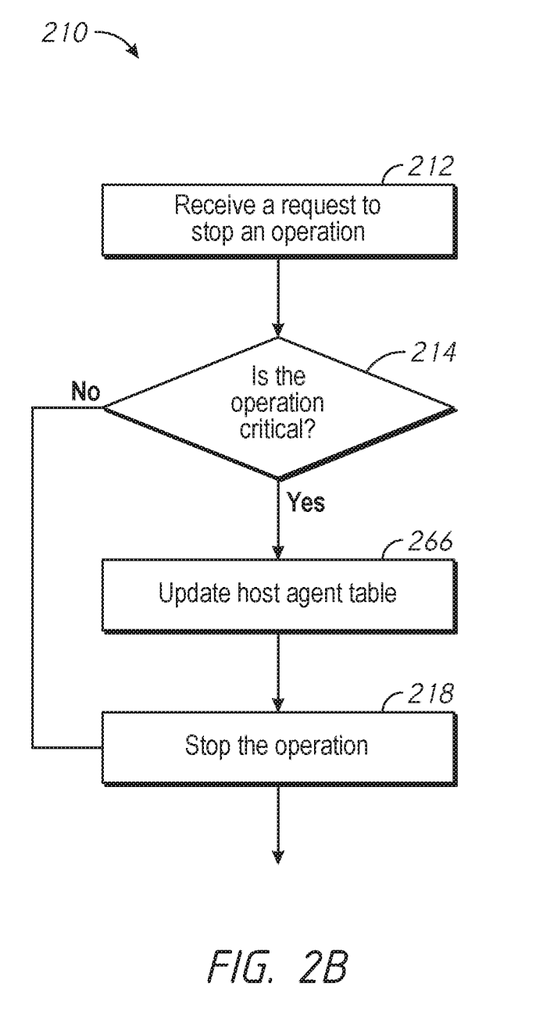

With reference to FIG. 2B, a host agent (e.g., 112 in FIG. 1) may also be configured to stop an operation. For example, process 210 may receive a request to stop an operation at 212. Before stopping the operation at 218, the process may determine whether the operation to be stopped includes any critical operations at 214. If the service includes a critical operation, the process may update the host agent table at 216. For example, the process may look for the entry to the type of critical operation to be stopped and decrease the count number associated with that type of critical operation.

The host agent table may include any suitable data structure. For example, the host agent table may include a hash table, which may store each type of critical operation and the associated count number of instances. In updating the host agent table, the hash table may receive the type of the critical operation to be started or stopped in a new service, provide an index to the count number associated with the type of critical operation and update the count number based on the index. In some or other examples, other suitable data structures may be used for the host agent table. For example, the host agent table may include a flat file in an operation system, or a table in a database system. The host agent table may be dynamically updated when an operation is started or stopped. When no critical operation is pending, the hash table may be cleaned up. For example, when the count number associated with an entry is decreased to zero, that entry may be removed from the hash table. When the number of entries in the hash table is zero, the hash table may become empty.

FIG. 3 illustrates a diagram of an example process of stopping a service in accordance with examples described herein. The example process may be implemented in the host agent (e.g., 112 in FIG. 1). In FIG. 3, a process 300 may include spawning a process at a time interval at 302. The spawned process may determine a memory utilization of a service at 304. For example, when a new service is started, the host agent may also spawn a new thread to monitor memory utilization of the service. Alternatively, and/or additionally, the new service may spawn a new thread to monitor the memory utilization of the service itself. In monitoring the memory utilization of the service, the spawned thread may determine whether the memory utilization of the service has exceeded a threshold at 306. For example, if a service has a memory leak, the memory leak may accumulate over time to cause the memory utilization to exceed a threshold, such as 90%, 80%, or other suitable threshold. If the memory utilization has not exceeded the threshold, the process may continue monitoring the memory utilization at 304 until the memory utilization has exceeded the threshold. In such case, the process may determine whether the service has any critical operations pending at 308.

In some examples, in determining whether the service has any critical operations pending, the process may query the host agent table. For example, the process may interrogate a database to access the host agent table. The process may also access a hash table of the host agent. If the host agent table is not empty, it means that at least one instance of a critical operation is still pending. In such case, the process 300 may wait for a time period, such as 60 seconds, and continue checking at 308 until no critical operation is pending. When no critical operation is pending, the process 300 may proceed to stop the service at 312. In some examples, if process 300 is a spawned thread of a service to be stopped, stopping the service at 312 includes killing the thread itself. Additionally, before stopping the service, process 300 may also record logs at 310 to store information about the stopped service. For example, the log may contain the services being stopped and the reasons (e.g., memory leaks or abnormal memory utilization) for which each of the services is stopped. The log may also contain debugging information that may be captured by the process.

In some examples, the process may be spawned at 302 at a time interval that is determined by the system. For example, the time interval to spawn the process for memory utilization monitoring may be 24 hours. The time interval may also be fewer or more than 24 hours.

Figure 4:
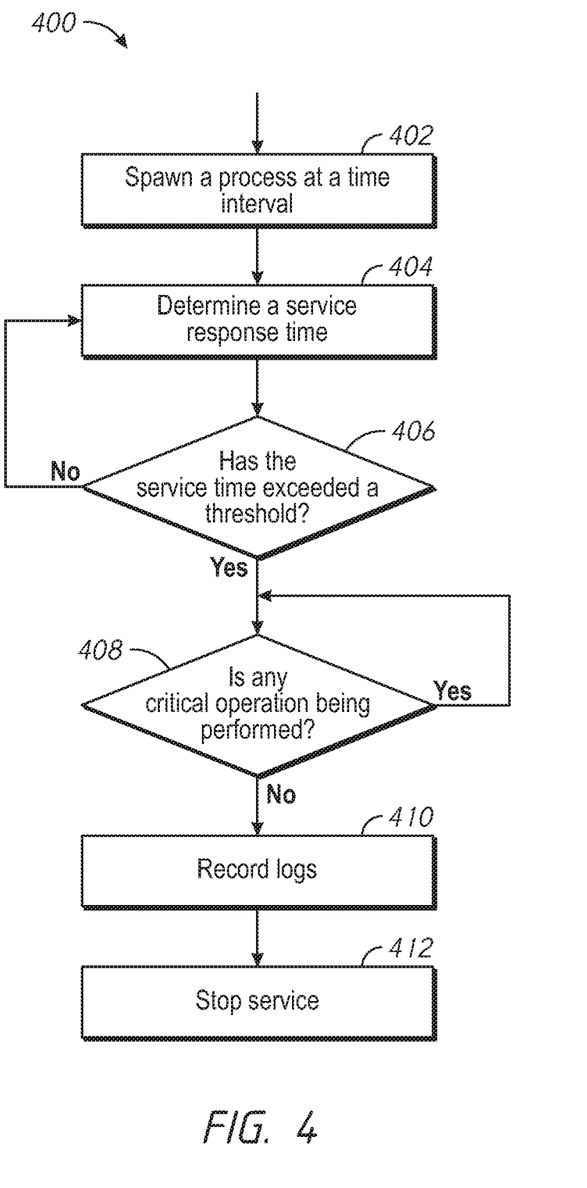

FIG. 4 illustrates a diagram of an example process of stopping a service in accordance with examples described herein. The example process may be implemented in the host agent (e.g., 112 in FIG. 1). In FIG. 4, a process 400 may include spawning a process at a time interval at 402. The spawned process may determine a service time at 404. For example, when a new service is started, the host agent may also spawn a new thread to monitor the service time. Alternatively, and/or additionally, the new service may itself spawn a new thread to monitor the service time. In some examples, when determining the service time, the process may perform a self-test and measure the service time. For example, the process may create a self-test calling service entry point with predetermined parameters and values. When the entry point is picked up by the service, the self-test calling service may be performed. In determining the service time, the process may measure the time it takes to complete the self-test in the system. The process may compare the actual service time to an expected service time, which may be based on the predetermined parameters and values when creating the service entry point. In other words, the service time of the self-test may be relative to the expected service time of the self-test.

With further reference to FIG. 4, process 400 may determine whether a measured service time has exceeded a threshold. For example, a measured service time may be compared to a threshold that has a value of a time, e.g., 10 ms. In another example, a measured service time may be relative to an expected service time. For example, the threshold may have a value that indicates a maximum allowed delay of completing the service relative to the expected service time. The process may continue monitoring the service time at 404 until the service time has exceeded the threshold. In such case, the process may determine whether the service has any critical operations pending at 408.

In some examples, in determining whether the service has any critical operations pending, the process may query the host agent table. If the host agent table is not empty, it means that at least one instance of a critical operation is still pending. In such case, the process 400 may wait for a time period, such as 60 seconds, and continue checking at 408 until no critical operation is pending. The process 400 may proceed to stopping the service at 412. In some examples, if process 400 is a spawned thread of the service to be stopped, stopping the service at 412 includes killing the thread itself. Additionally, process 400 may also record logs at 410 to store information about the stopped service. For example, the log may contain the services being stopped and the reasons (e.g., excessive service time) for which each of the services is stopped.

In some examples, the process may be spawned at 402 at a time interval that is determined by the system. For example, the time interval to spawn the process for monitoring the service time may be 1 hour. The time interval may also be fewer or more than 1 hour.

The various embodiments described herein provide advantages over existing systems and methods in managing software services in a computing system. For example, with the host agent, e.g., 112 in FIG. 1, services that may cause memory leaks or slow service time may be safely stopped without interrupting critical operations. Further, services that have caused memory leaks or have slowed down the service time may be stopped at an "optimal" time to avoid being stopped prematurely or too late.

From the foregoing it will be appreciated that, although specific embodiments have been described herein for purposes of illustration, various modifications may be made while remaining with the scope of the claimed technology. For example, the processes as described in FIGS. 3 and 4 may be implemented in a host agent (e.g., 112 in FIG. 1), as a spawned thread of the service being monitored, the spawned thread may communicate with other processes (e.g., memory utilization monitoring) via inter-process communication (IPC). In some examples, the spawned process in FIG. 3 or 4 may be independent of the service being monitored, where the spawned process may communicate with the service via other methods, such as using a common memory, a computer file or a database repository.

In some examples, various processes in FIGS. 3-4 may also be spawned at different time intervals and may be spawned at one or multiple times, each at a different time interval. In other variations, processes in FIGS. 3-4 may also be combined into one process that monitors the memory utilization and the service time.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

Various functions described herein may be implemented in hardware, software executed by a processor, firmware, or any combination thereof. If implemented in software (e.g., in the case of the methods described herein), the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims. "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications may be made without deviating from the spirit and scope of the present disclosure. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system comprising:
 a computing node including a processor, a hypervisor, and a host agent in communication with the hypervisor, the host agent configured to:
  start a service at the computing node;
  spawn a process that monitors a performance of the service and determines if the performance of the service has met a criteria to stop the service;
  maintain a data structure that stores information about operations requested by a plurality of other services in a cluster or cloud environment, the cluster or cloud environment including the computing node, wherein the operations are categorized into categories, wherein each entry in the data structure is associated with a category, and wherein the data structure includes a count number associated with each type of category;
  receive a request at the service from one of a plurality of other services in the cluster or cloud environment;
  determining whether the request is for an operation;
  in response to determining that the request is for the operation, adding the request to the data structure and incrementing a count number for an associated category associated with the operation;

executing the request in the service running on the compute node;
determine whether the performance of the service has met the criteria to stop the service based on the monitoring;
if the performance of the service has met the criteria:
access the data structure to determine whether any entries are stored in the data structure;
if it is determined that there are no entries stored in the data structure, stop the service; and
if it is determined that there are entries stored in the data structure,
update the data structure by decreasing a count number associated with one or more entries with the category associated with an operation to be stopped at the service, wherein when the count number associated with the category associated with the operation to be stopped is zero, the one or more entries are removed from the data structure,
query the data structure at predefined intervals until there are no entries stored in a database, and
stop the service when there are no entries in the data structure.

2. The system of claim 1, wherein the criteria to stop the service comprises at least one of:
a memory utilization of the service has exceeded a memory threshold; and
a service time of the service has exceeded a service threshold.

3. The system of claim 1, wherein the host agent is configured to, after starting the service, spawn the process to determine whether the performance of the service has met the criteria to stop the service.

4. The system of claim 3, wherein the spawned process is configured to:
determine that the performance of the service has met the criteria to stop the service if a service time associated with the service has exceeded a threshold.

5. The system of claim 4, wherein the spawned process is configured to determine the service time by executing a self-diagnosis service to determine the service time based on a response time for the self-diagnosis service.

6. The system of claim 3, wherein the spawned process is configured to determine that the performance of the service has met the criteria to stop the service if a memory utilization of the service has exceeded a threshold.

7. The system of claim 1, wherein the host agent is further configured to:
when determining that there are no entries stored in the data structure before stopping the service, record in a log information about a reason to stop the service.

8. The system of claim 1, wherein the hypervisor is further configured to:
responsive to the request including a request to begin the operation at the service, update the information about the operations associated with the service by updating the data structure to include the operation or to increment the count number of instances associated with an entry for the operation, and start the operation.

9. The system of claim 8, wherein the hypervisor is further configured to:
responsive to the request including a request to terminate the operation at the service, update the data structure by decreasing the count number of instances associated with the entry for the operation to be terminated or removing the entry for the operation, and terminating the operation.

10. The system of claim 8, wherein the data structure is a hash table.

11. The system of claim 8, wherein the data structure is a table.

12. The system of claim 1, wherein starting the service at the computing node comprises starting a first instance of the service at the computing node, the host agent further configured to:
update the information about the operation responsive to a second request from another of the plurality of services in the cluster or cloud environment, to begin or terminate an operation at a second instance of the service at a second computing node in the cluster or cloud environment.

13. The system of claim 1, wherein the service and the plurality of other services in the cluster or cloud environment are each configured to provide services to user virtual machines in the cluster or cloud environment.

14. A method comprising, by a host agent:
starting a service at a computing node in a cluster or cloud environment;
spawning a process that monitors a performance of the service and determines if the performance of the service has met a criteria to stop the service;
maintaining a data structure that stores information about operations requested by a plurality of other services in the cluster or cloud environment, wherein the operations are categorized into categories, wherein each entry in the data structure is associated with a category, and wherein the data structure includes a count number associated with each type of category;
receiving a request at the service from one of a plurality of other services in the cluster or cloud environment;
determining whether the request is for an operation;
in response to determining that the request is for the operation, adding the request to the data structure and incrementing a count number for an associated category associated with the operation;
executing the request in the service running on the compute node;
determining whether the performance of the service has met the criteria to stop the service based on the monitoring;
if the performance of the service has met the criteria:
accessing the data structure to determine whether any entries are stored in the data structure;
if it is determined that there are no entries stored in the data structure, stopping the service; and
if it is determined that there are entries stored in the data structure,
updating the data structure by decreasing a count number associated with one or more entries with the category associated with an operation to be stopped at the service, wherein when the count number associated with the category associated with the operation to be stopped is zero, the one or more entries are removed from the data structure,
querying the data structure at predefined intervals until there are no entries stored in a database, and
stopping the service when there are no entries in the data structure.

15. The method of claim 14, wherein the criteria to stop the service comprises at least one of:
a memory utilization of the service has exceeded the memory threshold; or
a service time of the service has exceeded a service threshold.

16. The method of claim 15, wherein determining whether the performance of the service has met the criteria comprises:
by the host agent, after starting the service, the spawned process configured to:
determine that the performance of the service has met the criteria to stop the service if the memory utilization of the service has exceeded memory threshold.

17. The method of claim 15, wherein determining whether the performance of the service has met the criteria comprises:
by the host agent, after starting the service, the spawned process configured to:
determine that the performance of the service has met the criteria to stop the service if the service time associated with the service has exceeded a the service threshold.

18. The method of claim 17, wherein determining the service time associated with the service comprises:
executing a self-diagnosis service to determine the service time based on a response time for the self-diagnosis service.

19. The method of claim 14 further comprising, by the host agent:
responsive to determining that there are no entries stored in the data structure and before stopping the service, recording in a log information about a reason to stop the service.

20. The method of claim 14 further comprising, by the host agent:
responsive to the request being a request to begin the operation at the service, updating the data structure to include the operation or to increment the count number of instances associated with an entry for the operation, and starting the operation, the data structure including information about operations in operation at the service.

21. The method of claim 20 further comprising, by the host agent:
responsive to the request being a request to terminate the operation at the service, updating the data structure by decreasing the count number of instances associated with an entry for the operation or removing the entry for the operation, and stopping the operation, the data structure including the information about operations in operation at the service.

22. The method of claim 20, wherein the data structure is a hash table.

23. The method of claim 20, wherein the data structure is a table.

24. The method of claim 14, wherein starting the service at the computing node comprises starting a first instance of the service at the computing node, the method further comprising:
updating the information about the operation responsive to a second request from another of the plurality of services in the cluster or cloud environment, to begin or terminate an operation at a second instance of the service at a second computing node in the cluster or cloud environment.

25. The method of claim 14, wherein the service and the plurality of other services in the cluster or cloud environment are each configured to provide services to user virtual machines in the cluster or cloud environment.

26. A system comprising:
a computing node including a processor, a hypervisor, and a host agent in communication with the hypervisor, the host agent configured to:
start a service at the computing node;
spawn a process that monitors a performance of the service and determines if the performance of the service has met a criteria to stop the service;
maintain a data structure that stores information about operations requested by a plurality of other services in a cluster or cloud environment, the cluster or cloud environment including the computing node, wherein the operations are categorized into categories, wherein each entry in the data structure is associated with a category, and wherein the data structure includes a count number associated with each type of category;
receive a request at the service from one of a plurality of other services in the cluster or cloud environment;
determining whether the request is for an operation;
in response to determining that the request is for the operation, adding the request to the data structure and incrementing a count number for an associated category associated with the operation;
executing the request in the service running on the compute node;
determine whether the performance of the service has met the criteria to stop the service based on the monitoring, including determining a memory utilization of the service and determining whether the memory utilization of the service has exceeded a threshold to stop the service;
if the performance of the service has met the criteria:
access the data structure to determine whether any entries are stored in the data structure;
if it is determined that there are no entries stored in the data structure , stop the service; and
if it is determined that there are entries stored in the data structure,
update the data structure by decreasing a count number associated with one or more entries with the category associated with an operation to be stopped at the service, wherein when the count number associated with the category associated with the operation to be stopped is zero, the one or more entries are removed from the data structure,
query the data structure at predefined intervals until there are no entries stored in a database, and
stop the service when there are no entries in the data structure.

27. The system of claim 26, wherein the hypervisor includes a data structure that stores information about operations requested by the plurality of other services in the cluster or cloud environment and the host agent is configured to:
responsive to the request being a request to begin the operation at the service, update the data structure to include the operation or to increment the number of instances associated with an entry for the operation, and start the operation.

28. The system of claim 27, wherein the data structure is a table.

29. The system of claim 26, wherein the hypervisor includes a data structure that stores information about operations requested by the plurality of other services in the cluster or cloud environment, wherein the host agent is further configured to:

responsive to the request being a request to terminate the operation at the service, update the data structure by decreasing the count number of instances associated with an entry for the operation or removing the entry for the operation, and stop the operation.

30. The system of claim 26, wherein starting the service at the computing node comprises starting a first instance of the service at the computing node, the host agent further configured to:
  update the information about the operation responsive to a second request from another of the plurality of other services in the cluster or cloud environment, to begin or terminate an operation at a second instance of the service at a second computing node in the cluster or cloud environment.

31. The system of claim 26, wherein the service and the plurality of other services in the cluster or cloud environment are each configured to provide services to user virtual machines in the cluster or cloud environment.

32. A non-transitory computer readable medium comprising instructions that, when executed, cause a computing node in a cluster or cloud environment to:
  start a service at the computing node;
    spawn a process that monitors a performance of the service and determines if the performance of the service has met a criteria to stop the service;
    maintain a data structure that stores information about operations requested by a plurality of other services in the cluster or cloud environment, wherein the operations are categorized into categories, wherein each entry in the data structure is associated with a category, and wherein the data structure includes a count number associated with each type of category;
    receive a request at the service from one of a plurality of other services in a cluster or cloud environment;
    determining whether the request is for an operation;
    in response to determining that the request is for the operation, adding the request to the data structure and incrementing a count number for an associated category associated with the operation;
    executing the request in the service running on the compute node;
  determine whether the performance of the service has met the criteria to stop the service based on the monitoring;
  if the performance of the service has met the criteria:
    access the data structure to determine whether any entries are stored in the data structure,
    if it is determined that there are no entries stored in the data structure, stop the service; and
    if it is determined that there are entries stored in the data structure,
      update the data structure by decreasing a count number associated with one or more entries with the category associated with an operation to be stopped at the service, wherein when the count number associated with the category associated with the operation to be stopped is zero, the one or more entries are removed from the data structure,
      query the data structure at predefined intervals until there are no entries stored in a database, and
      stop the service when there are no entries in the data structure.

33. The at least one non-transitory computer readable medium of claim 32, wherein the criteria to stop the service comprises at least one of:
  a memory utilization of the service has exceeded a memory threshold; or
  a service time of the service has exceeded a service threshold.

34. The at least one non-transitory computer readable medium of claim 33, wherein instructions for determining whether the performance of the service has met the criteria further comprising instructions for:
  after starting the service, spawning the process configured to:
    if the memory utilization of the service has exceeded the memory threshold, determine that the performance of the service has met the criteria to stop the service.

35. The at least one non-transitory computer readable medium of claim 33, wherein instructions for determining whether the performance of the service has met the criteria to stop the service further comprise instructions for:
  after starting the service, spawning the process configured to:
    determine that the performance of the service has met the criteria if the service time associated with the service has exceeded a service threshold.

36. The at least one non-transitory computer readable medium of claim 32, wherein starting the service at the computing node comprises starting a first instance of the service at the computing node, wherein a host agent is configured to:
  update the information about the operation responsive to a second request from another of the plurality of other services in the cluster or cloud environment, to begin or terminate an operation at a second instance of the service at a second computing node in the cluster or cloud environment.

37. The at least one non-transitory computer readable medium of claim 32, wherein the service and the plurality of other services executing in the cluster or cloud environment are each configured to provide services to user virtual machines in the cluster or cloud environment.

38. The at least one non-transitory computer readable medium of claim 32, wherein the determination is based at least on the information stored in the data structure maintained by the host agent, and wherein the data structure is a table.

* * * * *